United States Patent Office 3,042,625
Patented July 3, 1962

3,042,625
PROCESSES FOR BREAKING PETROLEUM EMULSIONS
Willard H. Kirkpatrick, Sugar Land, and Virgil L. Seale, Houston, Tex., assignors to Nalco Chemical Company, a corporation of Delaware
No Drawing. Filed Oct. 28, 1960, Ser. No. 65,563
13 Claims. (Cl. 252—342)

This invention, in general, relates to new compositions of matter and their use in the treatment of emulsions of mineral oil and water, such as petroleum emulsions commonly encountered in the production, handling and refining of crude mineral oil for the purpose of separating the oil from the water.

This application is a continuation-in-part of our copending application, Serial No. 676,934, filed August 8, 1957, now abandoned.

Petroleum emulsions are, in general, of the water-in-oil type wherein the oil acts as a continuous phase for the dispersal of finely-divided particles of naturally occurring waters or brines. These emulsions are often extremely stable and will not resolve on long standing. It is to be understood that water-in-oil emulsions may occur artificially, resulting from any one or more of numerous operations encountered in various industries. The emulsions obtained from producing wells and from the bottom of crude oil storage tanks are commonly referred to as "cut oil," "emulsified oil," "bottom settlings" and "B.S."

One type of process involves subjecting an emulsion of the water-in-oil type to the action of a deemulsifying agent of the kind hereinafter described, thereby causing the emulsion to resolve and stratify into its component parts of oil and water or brine after the emulsion has been allowed to stand in a relatively quiescent state.

One object of our invention is to provide a novel and economical process for resolving emulsions of the character referred to into their component parts of oil and water or brine.

Another object is to provide novel reagents which are interfacial and surface-active in order to enable their use as deemulsifiers or for such uses where surface-active characteristics are necessary or desirable.

The treating agents employed in accordance with the present invention consist of compositions of high molecular weight which are organic polycarboxylic acid mixed esters of (a) oxypropylated organic-solvent-soluble phenol formaldehyde condensation products of a difunctional alkyl phenol, the alkyl groups having on an average 4–15 carbons and (b) polyoxyalkylene glycols having a molecular weight of at least 1200. Monofunctional, dialkyl phenols, e.g., o-, p- or o,o-alkyl phenols, are not suitable for purposes of this invention, but amounts up to 25% of said dialkyl phenol in difunctional alkyl phenol may be tolerated. Dialkyl phenols with one alkyl group in the ortho or para position and one alkyl group in meta position are difunctional phenols for the purposes of this invention. The term "difunctional phenol" relates to the methylol-forming reactivity of the phenol with formaldehyde.

The weight ratio of propylene oxide to the phenol formaldehyde condensation product will, for most applications, fall between about 1:2 and 9:1, or even slightly higher, respectively. The polyoxyalkylene glycols may be either polyoxypropylene glycol or a mixed oxide glycol of propylene oxide and ethylene oxide where the weight ratio of oxyethylene to oxypropylene does not exceed 4:1. The weight ratio of the oxypropylated phenol-formaldehyde condensation product to polyoxyalkylene glycol in the resulting mixed esters of the polycarboxylic acid should be 1:6 to 6:1, preferably 1:4 to 4:1.

The preferred phenols used in the condensate polymers are monoalkyl phenols having the alkyl group in the functional positions of the phenolic ring upon which methylol groups form in the reaction with formaldehyde, i.e., the ortho or para positions. The alkyl groups in the phenolic substituent may be the same or they may be different, as when a mixture of alkyl phenols is the phenolic reactant. The average number of carbons in the alkyl groups of the phenolic reactant should be in the range of about 4–15. Alkyl groups of 4–9 carbons are preferred.

Examples of such phenols are o-n-butyl phenol, o-isobutyl phenol, p-n-butyl phenol, p-isobutyl phenol, p-tert. butyl phenol, o-amyl phenol, p-amyl phenol, p-tert. amyl phenol, o-octyl phenol, p-octyl phenol, o-nonyl phenol, p-nonyl phenol, o-dodecyl phenol, p-dodecyl phenol, mixtures of o-phenols and p-alkyl phenols, mixtures of ortho or para alkyl phenols with up to 25% o-, p-dialkyl phenols with 4–15 carbons in the alkyl groups such as the commercially available mixture of about 90% p-nonyl phenol with about 10% o-, p-dinonyl phenol, and mixtures of difunctional monoalkyl phenols whose alkyl groups average at least about 4 carbons and not more than about 15 carbons, e.g., mixtures of p-octyl phenol and p-nonyl phenol, a mixture of about 30% p-isopropyl phenol and 70% p-octyl phenol, and the like.

In our aforesaid copending application, we disclosed processes for breaking water-in-oil emulsions wherein the emulsion is subjected to the action of an organic, dicarboxylic acid mixed ester of (a) an oxypropylated organic-solvent-soluble phenol-formaldehyde condensation product of a monoalkyl phenol having 4-15 phenolic nuclei, the alkyl group having between 5 and 15 carbons inclusive, the weight ratio of propylene oxide to condensation product falling between about 1:2 and 9:1 respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxypropylated condensation product to polyoxyalkylene glycol being between 1:4 and 4:1. This disclosure embraces the disclosure in the aforesaid copending application.

PHENOL-FORMALDEHYDE CONDENSATION

The phenol-formaldehyde condensation products are prepared by reacting formaldehyde or a substance which breaks down to formaldehyde under the reaction conditions, e.g., para-formaldehyde and trioxane, and a difunctional alkyl phenol, often preferably crude mixture of alkyl phenols for economic reasons, by heating the reactants at 100–125° C. in the presence of a small amount of an acid catalyst such as sulfamic acid and preferably under substantially anhydrous conditions—excepting the water produced during the reaction. The aqueous distillate which begins to form is collected and removed from the reaction mixture. After several hours of heating at temperatures slightly above the boiling point of water, the mass becomes viscous and is permitted to cool to about 100 to 105° C. At this point a suitable hydrocarbon fraction is added, and heating is resumed. Further aqueous distillate begins to form, and heating is continued for an additional number of hours until at least about one mol of aqueous distillate per mol of the formaldehyde has been secured. The temperature at the end of the reaction reaches about 180°–250° C. The product is permitted to cool to yield the phenol-formaldehyde condensation product in a hydrocarbon solvent. The molecular weight of these intermediate condensation products cannot be ascertained with certainly, but we would approximate that the resins employed herein should contain about 4 to 15, preferably 4 to 10, phenolic nuclei per resin molecule. The solubility of the condensation product in hydrocarbon solvent would indicate that the resin is a linear type polymer, thus distinguishing them from the more common phenol-formaldehyde resins of the cross-linked type.

This aspect of the invention is illustrated in the following examples but is not limited thereto. The parts are by weight.

*Example A*

In a three-necked reaction flask provided with means of mechanical stirring and a return condenser system permitting the removal of any aqueous phase formed in the course of reaction, there is added 1500 parts of a crude alkyl phenol mixture which comprises an undistilled p-nonyl phenol containing approximately 10% of o, p-dinonylphenol, 225 parts paraformaldehyde and 3 parts of sulfamic acid which is present as a catalyst in the reaction. The reaction mass is heated, and at 108° C. an aqueous distillate begins to form. After three hours heating at approximately 110° C. the mass becomes quite viscous and is permitted to cool to about 100° C. At this point 600 parts of a suitable hydrocarbon fraction is added, and heating is resumed. Again at 110° C. further aqueous distillate begins to form, and heating is continued for an additional three hours, or until approximately 141 parts of aqueous distillate has been secured at a maximum temperature of 212° C. The product is permitted to cool to yield the finished phenol-formaldehyde resin in hydrocarbon solvent.

*Example B*

In a manner similar to Example A, 1000 parts of the same crude alkyl phenol mixture, 120 parts of paraformaldehyde and 2 parts sulfamic acid were heated 2 hours at 105–110° C. to permit reaction of the phenol and formaldehyde under conditions minimizing formaldehyde loss. At temperatures above 110° C. vigorous reaction sets in which must be controlled by cooling. After about 27 parts of aqueous distillate have been secured, the reaction comes under control and becomes exceedingly viscous. At this point the resin is cooled to 105° C., and 400 parts of a suitable hydrocarbon fraction is added. Heating is continued for an additional three hours, or until a total of about 75 parts of aqueous distillate have been removed at maximum temperature of 212° C. to yield the finished phenol-formaldehyde resin in hydrocarbon solvent.

*Example C*

In a manner similar to Examples A and B, 1000 parts of the same crude alkyl phenol mixture, 90 parts paraformaldehyde and 2 parts sulfamic acid are carefully reacted at temperatures of 100–110° C. When the reaction mass becomes quite viscous, the reaction is permitted to cool, and 400 parts of a suitable hydrocarbon fraction are added. Heating is resumed for an additional hour, or until a total of 55 parts of aqueous distillate have been secured at maximum temperature of 213° C. to yield the finished phenol-formaldehyde resin in hydrocarbon solvent.

In the preceding examples, sulfamic acid has been used as the acid catalyst to assist in the condensation reaction. Other suitable equivalent acids which may be used in place of sulfamic acid are mineral acids such as sulfuric acid, hydrochloric acid, phosphoric acid, etc.

As stated heretofore, intermediate phenol-formaldehyde resin should contain a minimum of about 4 phenolic nuclei and should not exceed about 15 phenolic nuclei. It is extremely difficult, if not impossible, to accurately determine the molecular weight of the intermediate resin products. However, it is believed that the resin of Example A contains about 10 phenolic nuclei per resin molecule, Example B, about 7 phenolic nuclei, and Example C, about 4 phenolic nuclei per resin molecule.

OXYPROPYLATION OF THE CONDENSATION PRODUCTS

Having prepared the intermediate phenol-formaldehyde products, the next step is the oxypropylation of the condensation products. This is achieved by mixing the intermediate phenol-formaldehyde condensation product in a hydrocarbon solvent with a small amount of sodium or potassium hydroxide in an autoclave. The condensation product is heated above 100° C., and 1,2-propylene oxide is charged into the autoclave until the pressure is in the vicinity of 75–100 p.s.i.

The reaction mixture is gradually heated until an exothermic reaction begins. The external heating is then removed, and propylene oxide is added at such a rate that the temperature is maintained between about 125–150° C. in a pressure range of 50 to 100 p.s.i. After all of the propylene oxide has been added, the temperature is maintained for an additional 1 to 2 hours to assure substantially complete reaction of the propylene oxide. The resulting product is the propylene oxide adduct of the alkyl phenol-formaldehyde condensation product, in which the weight ratio of the oxide to the condensation product is between about 1:2 and 9:1, respectively, or even slightly higher. The molecular weight of the oxypropylated phenol-formaldehyde condensation products of this invention range from as low as about 1100 to as high as about 50,000.

Some preferred embodiments of the oxypropylated, alkyl phenol-formaldehyde condensation products and methods of their preparation are illustrated in the following examples wherein all parts are by weight unless otherwise stated, but the invention is not limited thereto.

*Example D*

In an autoclave having a nominal capacity of 5 gallons, equipped with a means of external heating, cooling and mechanical agitation, there is charged 17 pounds of the alkyl phenol-formaldehyde resin of Example A and one-tenth pound sodium hydroxide. Into a transfer bomb there is introduced 26 pounds of propylene oxide. The resin intermediate is heated to 135° C., and the propylene oxide is charged into the reactor until reactor pressure is 50 p.s.i. The reaction mixture is gradually heated until an exothermic reaction begins to take place. The external heating is then removed, and propylene oxide is added at such a rate that the temperature is maintained between 135–145° C., with a pressure range of 50–80 p.s.i. After approximately two hours all of the oxide has been added to the autoclave and the temperature is maintained for an additional period of time to allow the reactor pressure to fall to a constant level. This may require as long as an additional two hours of reaction time to make certain that the unreacted oxide is reduced to a minimum. The resulting product is the propylene oxide adduct of a phenol-formaldehyde resin in which the ratio of oxide to resin by weight is 1½ to 1.

*Example E*

In a manner similar to Example D, the propylene oxide adduct of the resin of Example B was prepared in which the ratio of propylene oxide to resin was 1 to 1 by weight.

*Example F*

In a manner similar to Example D, the propylene oxide adduct of the resin of Example C was prepared in which the ratio of propylene oxide to resin was 2 to 1 by weight. The catalyst was potassium hydroxide.

*Example G*

In a manner similar to Example D, the propylene oxide adduct of the resin of Example A was prepared in which the ratio of propylene oxide to resin was 6 to 1 by weight.

Example H

In a manner similar to Example D, the propylene oxide adduct of the resin of Example C was prepared in which the ratio of propylene oxide to resin was 6 to 1 by weight.

Example J

In a manner similar to Example D, the propylene oxide adduct of the resin of Example A was prepared in which the ratio of propylene oxide to resin was 9 to 1 by weight.

Example K

In a manner similar to Example D, the propylene oxide adduct of the resin of Example A was prepared in which the ratio of propylene oxide to resin was 1 to 2 by weight.

Example L

In a manner similar to Example D, the propylene oxide adduct of the resin of Example C was prepared in which the ratio of propylene oxide to resin was 1 to 1 by weight.

ESTERIFICATION OF OXYPROPYLATED CONDENSATION PRODUCTS AND POLYALKYLENE GLYCOLS WITH POLYCARBOXYLIC ACIDS

The next and final step in the preparation of the compositions of our invention is the esterification of an organic, polycarboxylic acid, or in some instances the anhydride thereof, with the oxypropylated phenol-formaldehyde condensation products previously described and polyoxyalkylene glycols having a molecular weight of at least 1200. The ratio of the oxypropylated condensation product to the polyoxyalkylene glycol preferably ranges from 1:4 to 4:1 although it may be as large as 1:6 to 6:1. Preferably, the polycarboxy acid and polyalkylene glycol are heated until an aqueous distillate begins to form. Heating is then continued until sufficient aqueous distillate has been secured to indicate that the esterification is complete. The reaction product may contain some free carboxy groups. The mass is then cooled to about 150° C. at which point the oxypropylated phenol-formaldehyde condensation product is added. Heating is then resumed and continued until sufficient aqueous distillate has been secured to indicate completion of the esterification. After cooling, a suitable hydrocarbon fraction is added to yield the polycarboxy acid mixed ester of the polyoxyalkylene glycol and the oxypropylated phenol-formaldehyde condensation product in a hydrocarbon carrier.

It should be noted that it is preferred to carry out the esterification reaction step-wise. In this manner, products of the desired molecular weights and physical properties are formed consistently without the formation of undesirable insoluble polymers or materials which have too high a molecular weight or viscosity by virtue of excessive cross-linking. The fluid properties of the esters of this invention appear to be a definite factor in their properties as emulsion-breaking agents. In some instances simultaneous reaction of the oxypropylated condensation product and the polyoxyalkylene glycol is permissible, but experimentation is essential in order to avoid formation of infusible, insoluble resinous esters. The simultaneous reaction of the oxypropylated alkyl phenol-formaldehyde resins and the polyoxyalkylene glycols requires that the reactants be completely soluble at temperatures below that at which esterification commences. The ratio of dicarboxy acid or anhydride may be such as to provide a finished product essentially free of unreacted carboxyl groups or a finished product which contains a high percentage of unesterified carboxyl groups, e.g., up to about 30% of the total carboxyl groups of the acid (or equivalent carboxyl groups of the anhydride).

The invention will be further understood from the following examples wherein the parts are by weight unless otherwise indicated.

Example I

In a three-necked flask provided with means of mechanical stirring and heating there is added 200 parts by weight of polypropylene glycol 2000, 45 parts diglycolic acid and 50 parts of a suitable hydrocarbon solvent. These materials are heated to remove aqueous distillate in the amount of 7 parts. At this point the reaction mass is cooled to 150° C., and 200 parts of the oxypropylated resin of Example D is added. The temperature is again raised to remove aqueous distillate in the amount of 2 parts with a maximum final temperature of 270° C. The material is cooled, and 275 parts of a suitable hydrocarbon solvent and 50 parts isopropyl alcohol is added to give the finished product.

Example II

In a three-necked reaction flask provided with means of mechanical stirring and heating, there is added 300 parts by weight of a polyglycol prepared by adding 6 moles of ethylene oxide terminally to a mole of polypropylene glycol, 2700 molecular weight. Then 35 parts diglycolic acid and 50 parts of a suitable hydrocarbon solvent are added. The materials are reacted so as to remove 4½ parts of aqueous distillate with a maximum final temperature of 260° C. The reaction product is cooled to 150° C., and 200 parts of the oxypropylated resin of Example L are added. The materials are further heated to remove approximately 2 parts of aqueous distillate with a maximum final temperature of 270° C. The material is cooled, and 375 parts of a suitable hydrocarbon solvent is added to give the finished product.

Example III

In a manner similar to Example II a product is prepared wherein the 200 parts of the oxypropylated resin of Example L is replaced by 200 parts of the oxypropylated resin of Example E.

Example IV

In a manner similar to Example I, a product is prepared wherein the 200 parts of the oxyalkylated resin of Example D is replaced by 200 parts of the oxyalkylated resin of Example J.

Example V

In a three-necked reaction flask provided with means of mechanical stirring and heating, there is added 400 parts by weight of a polypropylene glycol of 2000 molecular weight, 60 parts of diglycolic acid and 50 parts of a suitable hydrocarbon solvent. These materials are heated to remove approximately 8½ parts of aqueous distillate at a maximum final temperature of 270° C. The material is cooled to approximately 150° C., and at this point 100 parts of the oxypropylated resin of Example K is added. The reaction mass is then further heated for a period of one hour to a maximum final temperature of 250° C. During this period of heating approximately 1 part of aqueous distillate is removed. After cooling 375 parts of a suitable hydrocarbon solvent is added to give the finished product.

Example VI

In a three-necked flask provided with means of mechanical stirring and heating, there is added 400 parts of a polyglycol prepared by adding 4 moles of ethylene oxide terminally to a mole of polypropylene glycol 2000. To this material 45 grams of maleic anhydride and 2 grams of diglycolic acid are added. These materials are heated together for a period of 6 hours at 140–150° C. At the end of this period of heating, 100 parts by weight of the oxypropylated resin of Example F is added, and the temperature is raised to remove approximately 2 parts of aqueous distillate with a maximum final temperature of 265° C. The material is then cooled, and 360 parts of a suitable hydrocarbon solvent is added to give the finished product.

The use of a small amount of diglycolic acid to neutralize residual alkali as the insoluble sodium diglycollate has been found exceedingly important in reactions where maleic acid or maleic anhydride is used as the dicarboxylic acid. Apparently the presence of small residues of alkaline catalyst used in the production of high molecular weight polyglycols gives rise to said reactions apparently involving the formation of derivatives of malic acid. Alkaline catalysts are known to favor the addition of alcohols across the maleic anhydride double bond, particularly in cases where the alcohol group is of primary configuration. This reaction is objectionable for the reason that maleic acid derivatives function as cross-linking agents and under certain processing conditions, particularly those involving long periods of heating at high temperatures, tend to favor the formation of rubbery, oil insoluble polymers.

*Example VII*

In a three-necked reaction flask provided with means of mechanical stirring and heating, there is added 400 parts of a polyglycol produced by adding 8 moles of ethylene oxide terminally to a polypropylene glycol of 2000 molecular weight. Sixty grams phthalic anhydride are added, and the materials heated together for a period of 8 hours at a temperature of 145–155° C. At the end of this time 100 parts of the oxypropylated resin of Example E are added, and the material is further heated to remove 3.5 parts of aqueous distillate with a maximum final temperature of 270° C. The material is cooled, and 360 parts of a suitable hydrocarbon solvent are added to give the finished product.

Dicarboxy acids or, in some instances, their anhydrides, which may be used to prepare the compositions of our invention include diglycolic, phthalic, oxalic, maleic malonic, succinic, adipic, azelaic, sebacic, fumaric, tartronic, malic, camphroic, tartaric and terephthalic acids. Higher molecular weight poly-basic acids which may be used include Emery's dimer acid and VR–1 acid.

Emery dimer acid is essentially dilinoleic acid. Similar dimerized fatty acids are made by polymerizing unsaturated fatty acids containing at least two nonconjugated double bonds. Such acids may also be described as polymer drying oil acids. The term "drying oil acid" is used herein to mean an unsaturated fatty acid containing at least two double bonds and at least six carbon atoms. The polymer acids employed for the purpose of the invention preferably consist predominantly of dimer acids but may contain trimers and higher polymers. The preferred polymer acids are those containing 12 to 40 carbon atoms and especially the polymers of the drying oil acids of the linoleic acid series, including, for example, the polymers of sorbic acid, geranic acid, palmitolic acid, linoleic acid and humoceric acid. It will be understood that these polymers may include cogeneric mixtures of polycarboxy acids.

A number of these polymer acids are available as by-product materials. Thus, one source of the polymeric acids suitable for the purposes of this invention is the still residue of the dry distillation of castor oil in the presence of sodium hydroxide. VR–1 acid is an acid of this type.

VR–1 acid is a mixture of polybasic acids, with an average molecular weight of about 1,000. It has an average of slightly more than two carboxylic acid groups per molecule. It is a by-product acid, and is a dark amber, rather viscous liquid. A typical sample of VR–1 acid gave the following analysis:

| | |
|---|---|
| Acid number | 150 |
| Iodine number | 36 |
| Saponification number | 172 |
| Unsaponifiable matter percent | 3.7, 3.5 |
| Moisture content do | 0.86 |

Among the suitable hydrocarbon vehicles which can be employed as solvents is sulfur dioxide extract, which is the solvent used in the above examples. This material is by-product from the Edeleanu process of refining petroleum in which the undesirable fractions are removed by extraction with liquid sulfur dioxide. After removal of the sulfur dioxide a mixture of hydrocarbons, substantially aromatic in character, remains and is designated in the trade as sulfur dioxide extract or $SO_2$ extract. Examples of other suitable hydrocarbon vehicles are toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

DEEMULSIFICATION

The compositions of this invention are surface-active and are particularly suitable for the deemulsification of crude oil emulsions. Deemulsification is achieved by mixing the deemulsifying agents of this invention, as a ratio in the approximate range of one part of the deemulsifying agent to 2,000–50,000 parts of the emulsion, and thereafter allowing the emulsion to remain in a relatively quiescent state during which separation of the oil and water occurs. The temperature of the emulsion may be in the range of about 50–210° F. The deemulsifying agents of this invention may be used in conjunction with other deemulsifying agents from classes such as the petroleum sulfonate type, the naphthalene sulfonic acid type, the modified fatty acid type, the amine modified oxyalkylated phenol-formaldehyde type, and others.

The effectiveness of the compositions in this invention as deemulsifying agents is illustrated in the following bottle test.

The bottle testing of crude oil emulsions is conducted according to the following procedure: fresh samples of the emulsion-breaking chemicals in organic solvent solution are prepared in 10% solutions. These solutions are made by accurately diluting 10 milliliters of the emulsion-breaking chemicals in 90 milliliters of a mixture of equal parts of anhydrous isopropyl alcohol and an aromatic hydrocarbon such as xylene. The mixture is agitated well until the emulsion-breaking chemical is completely dissolved.

By means of the 0.2 milliliter pipette, the prescribed volume of the 10% solution of the emulsion-breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

During the test the speed of the water drop is observed carefully after the emulsion-breaking chemical is added to the prescription bottles. The observation of the color and brilliance of the oil in transmitted light is very important. In general, the brilliance and depth of color increases with a decrease in B.S. & W. (bottom settlings and water) content. The observations of color are made in the oil in the prescription bottles before and after heat treatment. In the ideal treatment of crude oil emulsions the oil-water line could be a sharp, clean line without any web or sludge present. Presence of a considerable amount of sludge or web is undesirable because this foreign material will eventually go to stock in the treating plant and be reported as B.S. Traces of web or sludge, however, will disappear or be removed in the normal treating plant.

By way of illustrating the effectiveness of the emulsion-breaking chemicals contemplated by this invention, the composition of Example I was tested according to the foregoing bottle testing procedure on samples of 30 gravity crude oil obtained from Byron-Garland Field, Wyoming. The crude oil emulsion contained over 30% water. The commercial treating chemical being used on the lease, as well as the composition of Example I, was tested for comparative purposes. Both treating chemicals were added at a ratio of 0.20 part of a 10% solution, as described in the foregoing procedure, to 100 parts of the emulsion fluid. Each of the samples were given 200 shakes cold and 50 shakes hot, the hot temperature being 140° F. The water drop in 40 minutes was 4 cc. for the commercial chemical and 8 cc. for the chemical of Example I; and the water drop after 3 hours for the commercial chemical was 18 cc., whereas the water drop for the chemical of Example I was 22 cc.

The invention is hereby claimed as follows:

1. A process for breaking emulsions of the water-in-oil type which comprises subjecting said emulsion to the action of an organic, dicarboxy acid mixed ester of (a) a polyoxypropylated alkyl phenol-formaldehyde condensation products having 4–15 phenolic nuclei, said alkyl phenol being at least 75% difunctional alkyl phenol with the alkyl groups of the phenol having an average number of carbons in the range of 4–15, the weight ratio of oxypropylene groups to condensation product falling between about 1:2 and 9:1, respectively, and (b) polyoxyalkylene glycol having a molecular weight of at least 1200, said glycol selected from the group consisting of polyoxypropylene glycol and oxyethylene-oxypropylene glycol in a weight ratio of oxyethylene groups to oxypropylene groups not exceeding 4:1, the weight ratio of polyoxypropylated condensation product to polyoxyalkylene glycol being between about 1:6 and 6:1, and separating the resolved water and oil phases of the broken emulsion.

2. A process for breaking emulsions of the water-in-oil type which comprises subjecting said emulsion to the action of an organic, dicarboxy acid mixed ester of (a) a polyoxypropylated alkyl phenol-formaldehyde condensation product having 4–15 phenolic nuclei, said alkyl phenol being at least 75% difunctional alkyl phenol with the alkyl groups of the phenol having an average number of carbons in the range of 4–15, the weight ratio of oxypropylene groups to condensation product falling between about 1:2 and 9:1, respectively, and (b) polyoxypropylene glycol having a molecular weight of at least 1200, the weight ratio of polyoxypropylated condensation product to polyoxypropylene glycol being between about 1:6 to 6:1, and separating the resolved water and oil phases of the broken emulsion.

3. A process for breaking emulsions of the water-in-oil type which comprises subjecting said emulsion to the action of an organic, dicarboxy acid mixed ester of (a) a polyoxypropylated alkyl phenol-formaldehyde condensation product having 4–15 phenolic nuclei, said alkyl phenol being at least 75% difunctional alkyl phenol with the alkyl groups of the phenol having an average number of carbons in the range of 4–15, the weight ratio of oxypropylene groups to condensation product falling between about 1:4 and 9:1, respectively, and (b) a polyoxyalkylene glycol having a molecular weight of at least 1200, said glycol being oxyethylene-oxypropylene glycol in a weight ratio of oxyethylene groups to oxypropylene groups not exceeding 4:1, the weight ratio of polyoxypropylated condensation product to polyoxyalkylene glycol being between about 1:6 to 6:1, and separating the resolved water and oil phases of the broken emulsion.

4. A process for breaking emulsions of the water-in-oil type which comprises subjecting said emulsion to the action of a diglycolic acid mixed ester of (a) a polyoxypropylated alkyl phenol- formaldehyde condensation product having 4–15 phenolic nuclei, said alkyl phenol being at least 75% difunctional alkyl phenol with the alkyl groups of the phenol having an average number of carbons in the range of 4–15, the weight ratio of oxypropylene groups to condensation product falling between about 1:2 and 9:1, respectively, and (b) polyoxyalkylene glycol having a molecular weight of at least 1200, said glycol selected from the group consisting of polyoxypropylene glycol and oxyethylene-oxypropylene glycol in a weight ratio of oxyethylene to oxypropylene groups not exceeding 4:1, the weight ratio of polyoxypropylated condensation product to polyoxyalkylene glycol being between about 1:6 and 6:1, and separating the resolved water and oil phases of the broken emulsion.

5. A process for breaking emulsions of the water-in-oil type which comprises subjecting said emulsion to the action of a maleic acid mixed ester of (a) a polyoxypropylated alkyl phenol-formaldehyde condensation product having 4–15 phenolic nuclei, said alkyl phenol being at least 75% difunctional alkyl phenol with the alkyl groups of the phenol having an average number of carbons in the range of 4–15, the weight ratio of oxypropylene groups to condensation product falling between about 1:2 and 9:1, respectively, and (b) polyoxyalkylene glycol having a molecular weight of at least 1200, said glycol selected from the group consisting of polyoxypropylene glycol and oxyethylene-oxypropylene glycol in a weight ratio of oxyethylene groups to oxypropylene groups not exceeding 4:1, the weight ratio of polyoxypropylated condensation product to polyoxyalkylene glycol being between about 1:6 and 6:1, and separating the resolved water and oil phases of the broken emulsion.

6. A process for breaking emulsions of the water-in-oil type which comprises subjecting said emulsion to the action of a phthalic acid mixed ester of (a) a polyoxypropylated alkyl phenol-formaldehyde condensation product having 4–15 phenolic nuclei, said alkyl phenol being at least 75% difunctional alkyl phenol with the alkyl groups of the phenol having an average number of carbons in the range of 4–15, the weight ratio of oxyproylene groups to condensation product falling between about 1:2 and 9:1, respectively, and (b) polyoxyalkylene glycol having a molecular weight of at least 1200, said glycol selected from the group consisting of polyoxypropylene glycol and oxyethylene-oxypropylene glycol in a weight ratio of oxyethylene groups to oxypropylene groups not exceeding 4:1, the weight ratio of polyoxypropylated condensation product to polyoxyalkylene glycol being between about 1:6 and 6:1, and separating the resolved water and oil phases of the broken emulsion.

7. A process for breaking emulsions of the water-in-oil type which comprises subjecting the emulsion to the action of an organic, dicarboxylic acid mixed ester of (a) an oxypropylated organic-solvent-soluble phenol-formaldehyde condensation product of a monoalkyl phenol having 4–15 phenolic nuclei, the alkyl group having between 5 and 15 carbons inclusive, the weight ratio of propylene oxide to condensation product falling between about 1:2 and 9:1 respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxypropylated condensation product to polyoxyalkylene glycol being between 1:4 and 4:1.

8. A process for breaking emulsions of the water-in-oil type which comprises subjecting the emulsion to the action of an organic, dicarboxylic acid mixed ester of (a) a propylene oxide adduct of an organic-solvent-soluble phenol-formaldehyde condensation product of an alkyl phenol having 4–15 phenolic nuclei, said alkyl phenol being primarily a monoalkyl phenol containing not greater than about 25% dialkyl phenol, the alkyl group having between 5 and 15 carbons inclusive, the weight ratio of propylene oxide to condensation product falling between about 1:2 and 9:1, respectively, and (b) a polyoxyalkylene glycol having a molecular weight of at least 1200, said glycol selected from the group consisting of polyoxypropylene glycol and oxyethylene, oxypropylene glycol in a weight ratio of ethylene oxide to propylene oxide not exceeding 4:1, the weight ratio of oxypropylated condensation product to polyoxyalkylene glycol being between about 1:4 and 4:1.

9. A process for breaking emulsions of the water-in-oil type which comprises subjecting the emulsion to the action of an organic, dicarboxylic acid mixed ester of (a) an oxypropylated organic-solvent-soluble phenol-formaldehyde condensation product of an alkyl phenol having 4–15 phenolic nuclei, said phenol being primarily a monoalkyl phenol, the alkyl group having between 5 and 15 carbons inclusive, the weight ratio of propylene oxide to condensation product falling between about 1:2 and 9:1, respectively, and (b) polyoxyproylene glycol having a molecular weight of at least 1200, the weight ratio of oxypropylated condensation product to polyoxyproylene glycol being between about 1:4 and 4:1.

10. A process for breaking emulsions of the water-in-oil type which comprises subjecting the emulsion to the action of an organic, dicarboxylic acid mixed ester of (a) an oxypropylated organic-solvent-soluble phenol-formaldehyde condensation product of an alkyl phenol having 4–15 phenolic nuclei, said alkyl phenol being primarily a monoalkyl phenol, the alkyl group having between 5 and 15 carbons inclusive, the weight ratio of propylene oxide to condensation product falling between about 1:2 and 9:1, respectively, and (b) a polyoxyalkylene glycol having a molecular weight of at least 1200, said glycol being oxyethylene, oxypropylene glycol in a ratio of oxyethylene to oxypropylene not exceeding 4:1, the weight ratio of oxypropylated condensation product to polyoxyalkylene glycol being between about 1:4 and 4:1.

11. A process for breaking emulsions of the water-in-oil type which comprises subjecting the emulsion to the action of a diglycolic acid mixed ester of (a) an oxypropylated, organic-solvent-soluble phenol-formaldehyde condensation product of a monoalkyl phenol having 4–15 phenolic nuclei, the alkyl group having between 5 and 15 carbons inclusive, the weight ratio of propylene oxide to condensation product falling between about 1:2 and 9:1, respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxypropylated condensation product to polyoxyalkylene glycol being between about 1:4 and 4:1.

12. A process for breaking emulsions of the water-in-oil type which comprises subjecting the emulsion to the action of a maleic acid mixed ester of (a) an oxypropylated organic-solvent-soluble phenol-formaldehyde condensation product of a solvent-soluble phenol-formaldehyde condensation product of a monoalkyl phenol having 4–15 phenolic nuclei, the alkyl group having between 5 and 15 carbons inclusive, the weight ratio of propylene oxide to condensation product falling between about 1:2 and 9:1, respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxypropylated condensation product to polyoxyalkylene glycol being between about 1:4 and 4:1.

13. A process for breaking emulsions of the water-in-oil type which comprises subjecting the emulsion to the action of a phthalic acid mixed ester of (a) an oxypropylated, organic-solvent-soluble phenol-formaldehyde condensation product of a monoalkyl phenol having 4–15 phenolic nuclei, the alkyl group having between 5 and 15 carbons inclusive, the weight ratio of propylene oxide to condensation product falling between about 1:2 and 9:1, respectively, and (b) polyoxyalkylene glycol having a molecular weight of at least 1200, said glycol selected from the group consisting of polyoxypropylene glycol and oxyethylene, oxypropylene glycol in a weight ratio of oxyethylene to oxypropylene not exceeding 4:1, the weight ratio of oxypropylated condensation product to polyoxyalkylene glycol being between about 1:4 and 4:1.

References Cited in the file of this patent

UNITED STATES PATENTS

| | | |
|---|---|---|
| 2,454,544 | Bock et al. | Nov. 23, 1948 |
| 2,454,545 | Bock et al. | Nov. 23, 1948 |
| 2,542,012 | De Groote et al. | Feb. 20, 1951 |
| 2,581,380 | De Groote et al. | Jan. 8, 1952 |
| 2,695,914 | De Groote et al. | Nov. 30, 1954 |
| 2,766,213 | Dickson | Oct. 9, 1956 |